S. W. LUITWIELER.
MOTOR PROPELLED FIRE APPARATUS.
APPLICATION FILED NOV. 8, 1911.
1,152,113.
Patented Aug. 31, 1915.
5 SHEETS—SHEET 4.
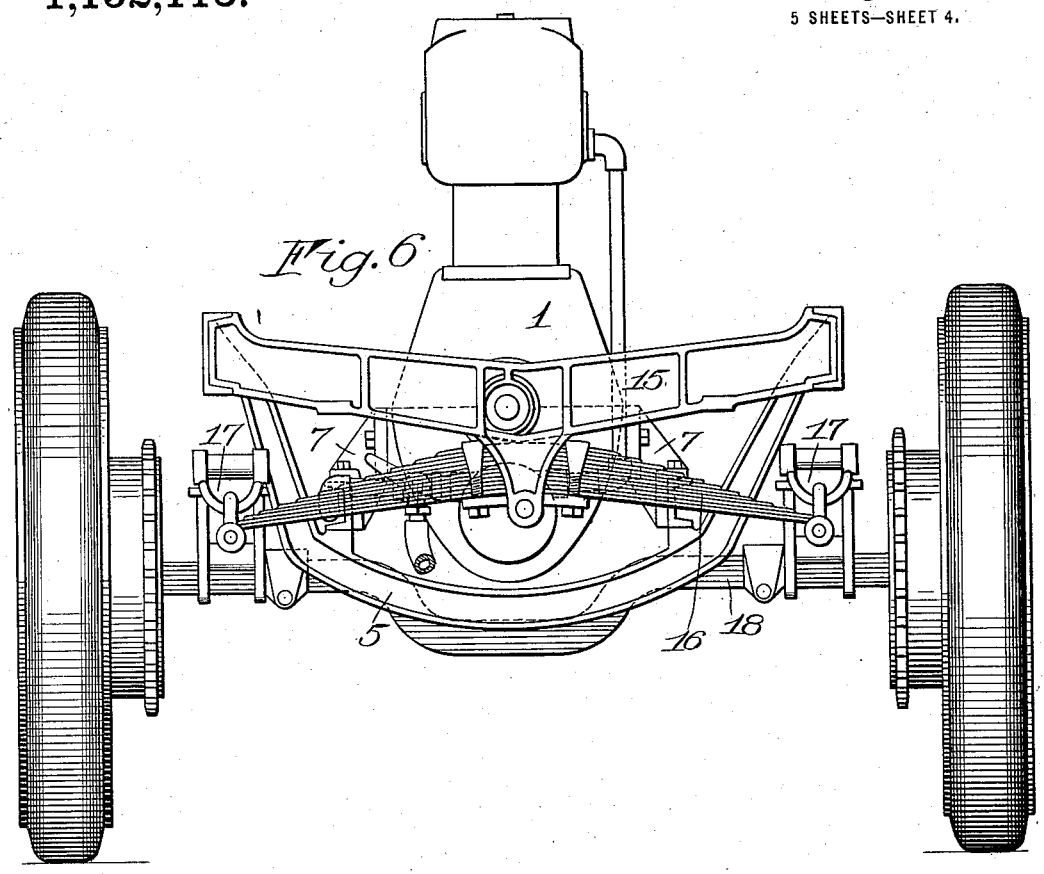
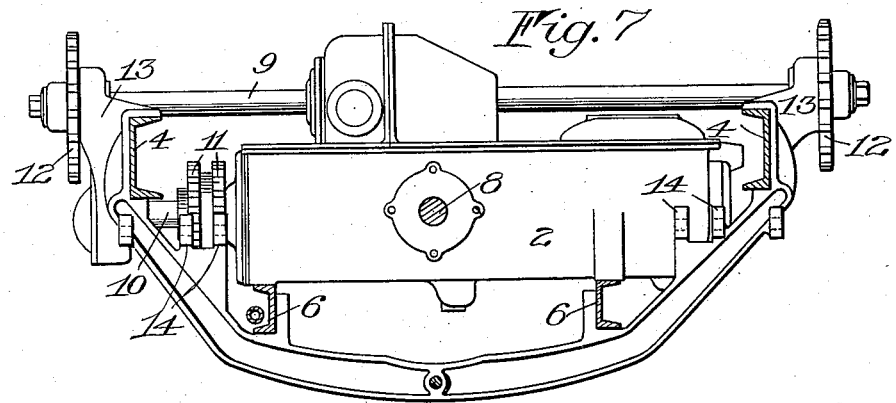

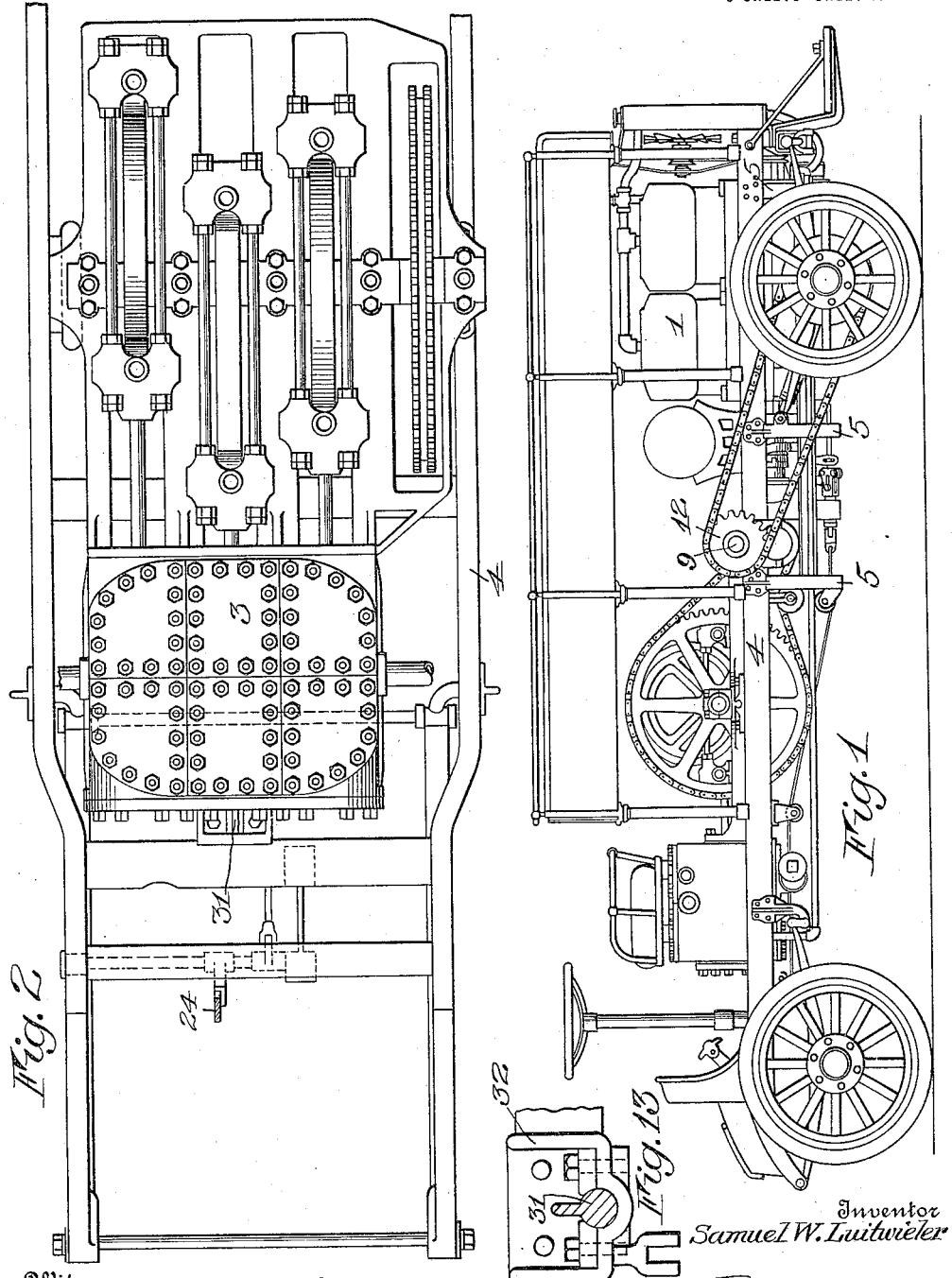

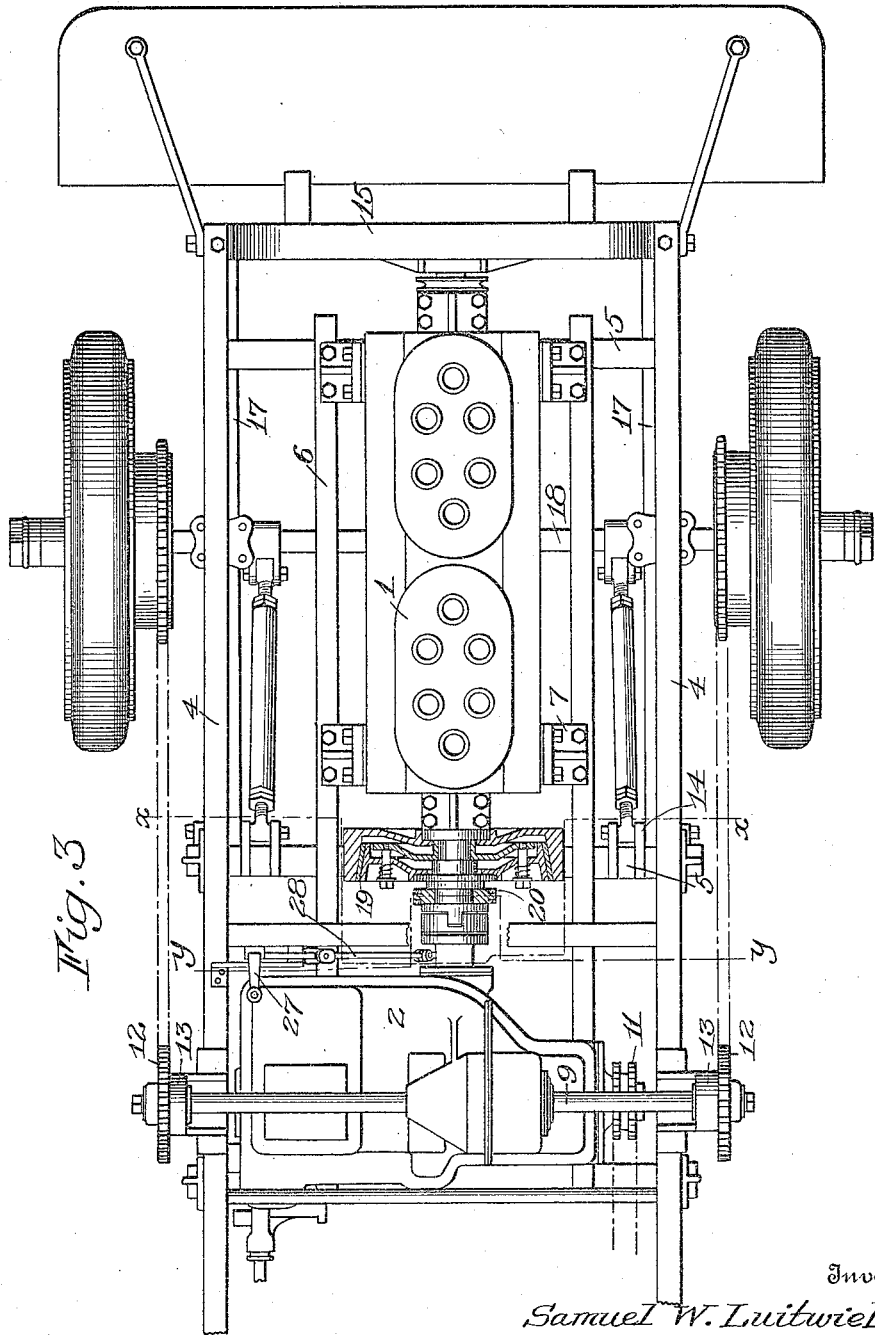

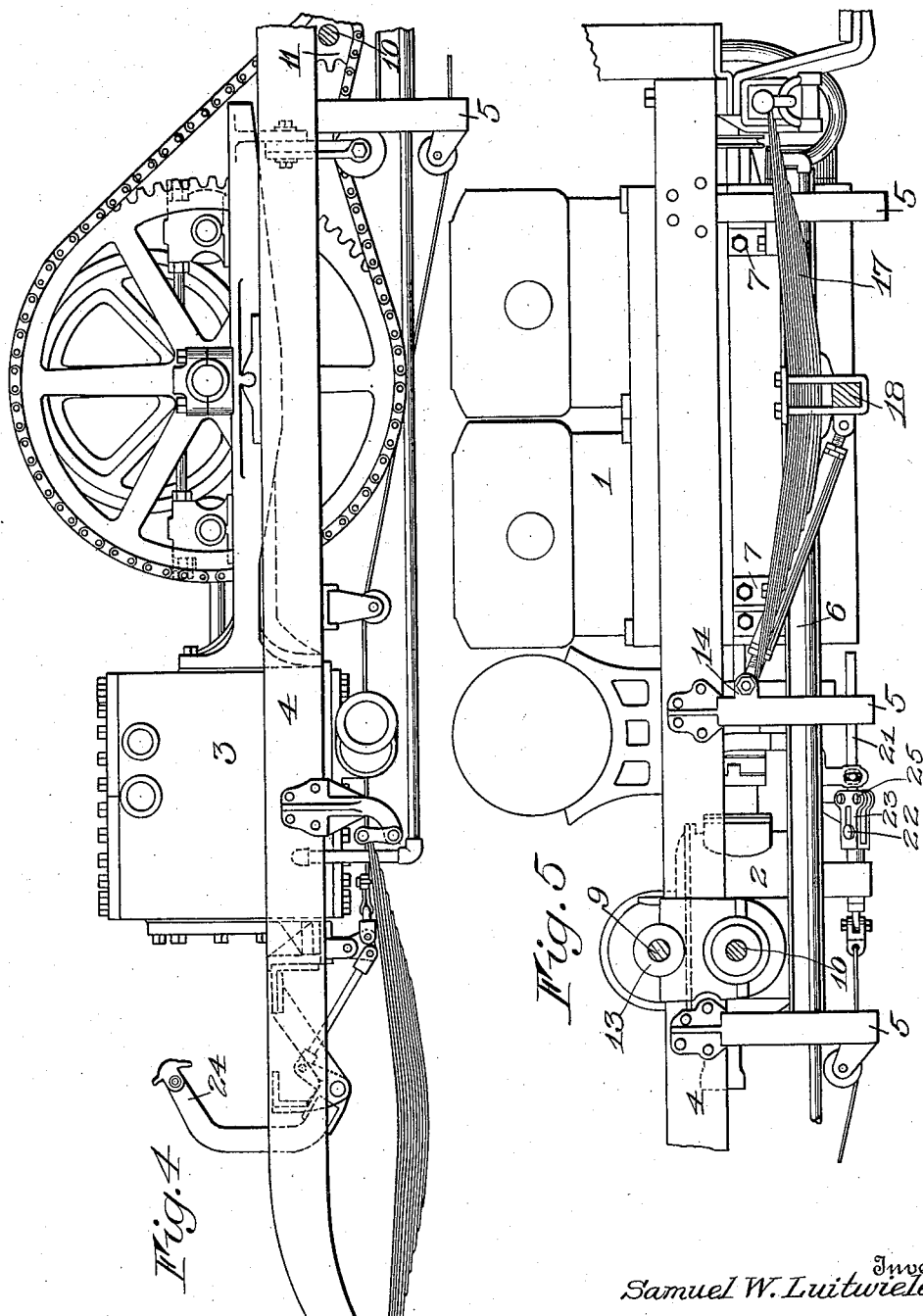

S. W. LUITWIELER.
MOTOR PROPELLED FIRE APPARATUS.
APPLICATION FILED NOV. 8, 1911.
1,152,113.
Patented Aug. 31, 1915.
5 SHEETS—SHEET 5.
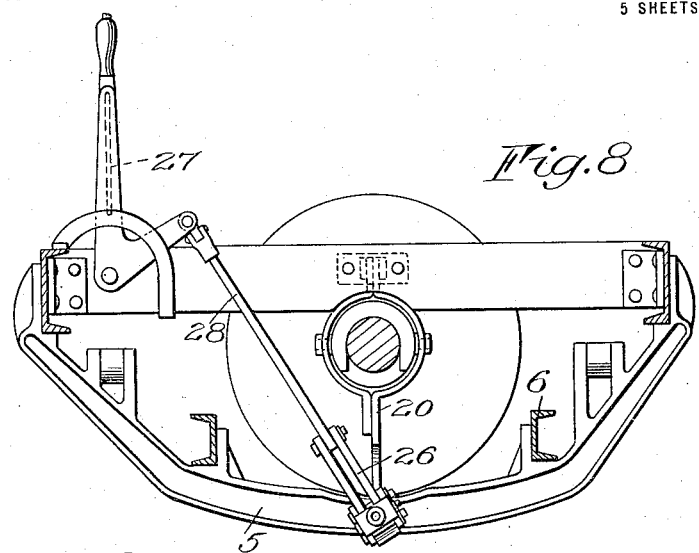
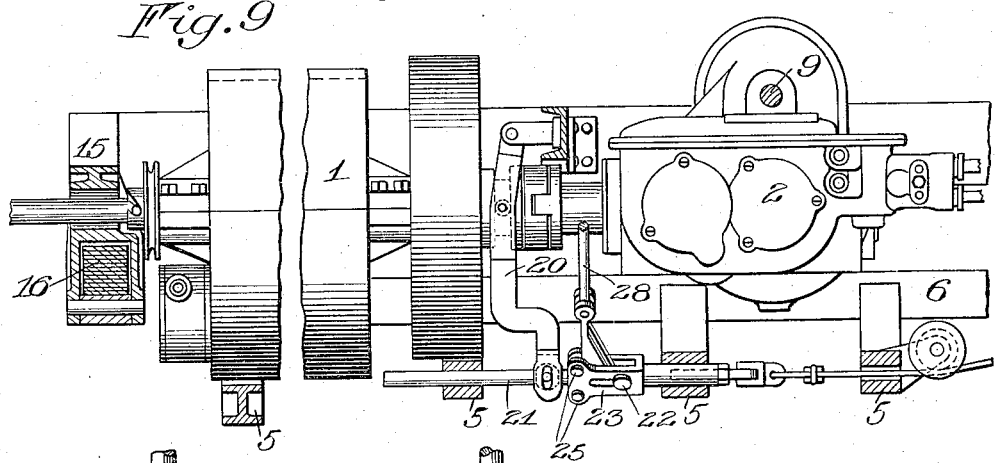
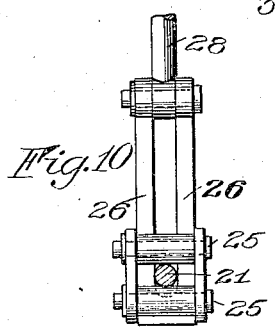
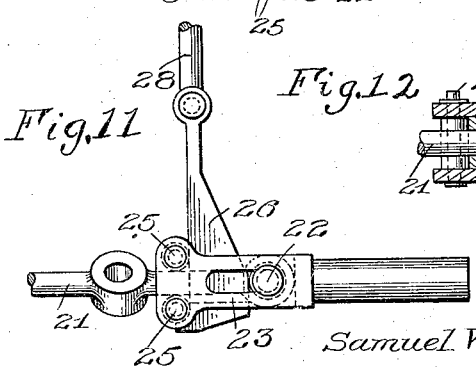
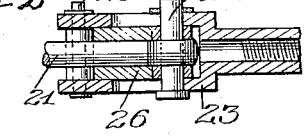
Inventor
Samuel W. Luitwieler
Witnesses

UNITED STATES PATENT OFFICE.

SAMUEL W. LUITWIELER, OF ROCHESTER, NEW YORK.

MOTOR-PROPELLED FIRE APPARATUS.

1,152,113.   Specification of Letters Patent.   Patented Aug. 31, 1915.

Application filed November 8, 1911. Serial No. 659,222.

*To all whom it may concern:*

Be it known that I, SAMUEL W. LUITWIELER, of Rochester, in the county of Monroe and State of New York, have invented certain new and useful Improvements in Motor-Propelled Fire Apparatus; and I do hereby declare the following to be a full, clear, and exact description of the same, reference being had to the accompanying drawings, forming a part of this specification, and to the reference-numerals marked thereon.

The present invention relates to improvements in motor propelled fire apparatus, and it has for its object to provide an improved construction for motor vehicles of the type in which the motor is arranged to be used alternately for driving the vehicle, and for driving a pump on the vehicle.

A further object of my invention is the provision of a novel construction and arrangement of parts for the frame or body of the vehicle so as to support the engine, the transmission gear, and the pump, all in a manner which secures greater rigidity of the machine mechanism and enables the parts to be assembled readily and securely.

A further object of my invention consists in making provision for locking the clutch control between the engine and the pump when the latter is operating, and to prevent the same from being accidentally disconnected.

To these and other ends the invention consists in certain improvements and combinations of parts, all as will be hereinafter more fully described, the novel features being pointed out in the claims at the end of the specification.

In the drawings: Figure 1 is a view in side elevation of an apparatus embodying a preferred form of my improvements, and showing only such parts of the structure as are necessary for an understanding of the invention; Fig. 2 is an enlarged plan view of the forward part of the machine; Fig. 3 is an enlarged plan view of the rear part of the machine, with the clutch appearing in section, this view being a continuation of Fig. 2; Fig. 4 is an enlarged side elevation of the forward part of the machine; Fig. 5 is an enlarged side elevation of the rear part of the machine, this view being a continuation of Fig. 4; Fig. 6 is an enlarged rear end elevation, with parts omitted; Fig. 7 is a transverse sectional view, with parts omitted, taken on the line *x—x* of Fig. 3; Fig. 8 is a transverse sectional view taken on the line *y—y* of Fig. 3, showing the disconnecting means for the clutch; Fig. 9 is a detail side elevation of the engine, transmission gear casing, and clutch controlling devices looking in the opposite direction from Fig. 1; Fig. 10 is a detail view in end elevation of the disconnecting means; Fig. 11 is a view in side elevation of the same; Fig. 12 is a sectional view on the line *x—x* of Fig. 11, and Fig. 13 is a detail view of the front bearing for the pump.

Similar reference numerals throughout the several figures indicate the same parts.

In the present embodiment of the invention, I have disclosed a preferred form of a machine, omitting such details of the mechanism as are not necessary to a full and complete understanding of the invention.

1 designates the engine, and 2 is the transmission gear casing inclosing the improved form of transmission gearing disclosed in an application filed by me March 11, 1911, Serial No. 613,752; and 3 designates the pump, preferably of the triplex type, as embodied in an application filed by me December 29, 1910, Serial No. 599,844, the parts just referred to being supported on the frame of the machine in a manner that will now be described.

The frame preferably includes side pieces 4, on which are mounted the hangers 5 which extend transversely of the machine, and downwardly below the side pieces, as shown clearly in Figs. 6 and 7. Supported on the hangers 5 are the longitudinally arranged beams 6, on which the engine is supported by means of the legs 7, which are suitably secured to the engine and bolted to the beams 6, as appearing in Fig. 6.

The gear casing 2 is supported on the beams 6, as shown in Fig. 7, and incloses a transmission gear which includes the driving shaft 8, jack-shaft 9, and the supplemental shaft 10, the latter being provided with a suitable sprocket 11 by means of which chain connection is made to the pump 3. The sprockets 12 are provided on the jack-shaft 9 and afford a means for connecting the engine with the driving wheels of the vehicle through suitable chains. The jack-shaft 9 is suitably mounted in a portion of the gear casing and in the outriggers 13 which are supported on the side pieces 4, as shown in Fig. 7. Lugs 14 are also formed on the hanger 5, as shown, for a purpose that will now be made clear. The side pieces 4 are connected at the rear of the machine by a cross bar 15, which latter is connected to, and has a bearing on a transversely arranged spring 16. The transverse spring 16 has pivotal relation with the rear ends of longitudinally arranged springs 17, which are mounted on the rear axle 18, and are connected at their forward ends to the frame through the lugs 14, previously referred to.

The engine is adapted to be connected to the transmission gears through the clutch 19, which may be of any approved type, and is preferably of the form disclosed in the present embodiment. The clutch is arranged to be actuated by the operating member 20 which is pivotally connected to the pull rod 21, to which is secured the laterally projecting pin 22, the latter being arranged for coöperation with the slotted walls of a yoke 23. Said yoke is connected by means of suitable devices, as shown, with the controlling lever 24 arranged at the front of the machine, to operate the clutch. The yoke 23 carries pins 25 arranged transversely thereof, and adapted to engage a coöperating surface on the bifurcated wedge 26, the latter being operable from a lever 27 through the connecting rod 28. When the wedge 26 is in the position shown in Fig. 11, with its widest portion engaging the pins 22, and 25, respectively, longitudinal movement of the yoke 23 actuates the pull rod 21 thereby operating the clutch to connect or disconnect the engine from the driving shaft. When the apparatus reaches a fire, the transmission is operated so that the engine is disconnected from the driving wheels of the vehicle and operatively connected to the pump, and under these conditions it is desirable to prevent operation of the clutch from the front of the machine so as to obviate the unintentional or inadvertent disconnection of the pump; to this end, the lever 27 may be operated to move the wedge 26 so as to bring the narrowest portion of the latter in alinement with the pull rod 21. With the parts in this position, if the yoke 23 is actuated, the slots in the walls thereof merely move along on the pin 22, without moving the pull rod 21, and no operation of the latter takes place until the lever 27 is operated to move the wedge into connecting position.

The frame of the machine is subject to various strains and torsional forces and it is essential that the pump remain constantly in one position relatively to the transmission gearing and engine, without being affected by any movements of the frame. To this end, in the present embodiment, the pump is preferably supported at three points, being pivotally mounted on the side pieces and having a single bearing at the front. The pump frame is provided with suitable trunnions engaging bearings which are mounted on the side pieces 4. At the front, the pump frame carries an extension 31, which has slidable engagement with a socket formed in the bracket 32, the latter being fixed to the frame of the machine in any suitable manner.

While I have described a preferred form of my invention, it is to be understood that I am not limited to the exact construction herein disclosed, but may adopt certain changes and modifications without departing from the spirit and scope of the present invention.

I claim as my invention:

1. In a motor propelled fire apparatus, the combination with an engine, of a drive shaft, a clutch for operatively connecting the engine and drive shaft, an operating member for the clutch, a lever, connections between the lever and the operating member including an adjustable element which serves to connect and disconnect the lever with the operating member.

2. In a motor propelled fire apparatus, the combination with an engine, of a drive shaft, a clutch for operatively connecting the engine and drive shaft, an operating member for the clutch, a lever controlling the operating member, and means movable with the lever and adapted to be moved independently of the lever for disconnecting it from the operating member.

SAMUEL W. LUITWIELER.

Witnesses:
H. E. STONEBRAKER,
HENRY W. HALL.

Copies of this patent may be obtained for five cents each, by addressing the "Commissioner of Patents, Washington, D. C."